United States Patent
Mahkovec et al.

(10) Patent No.: US 10,277,673 B2
(45) Date of Patent: Apr. 30, 2019

(54) LOCAL SERVER FOR SYNCED ONLINE CONTENT MANAGEMENT SYSTEM

(71) Applicant: Dropbox, Inc., San Francisco, CA (US)

(72) Inventors: Ziga Mahkovec, San Francisco, CA (US); Rajeev Nayak, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/248,965

(22) Filed: Aug. 26, 2016

(65) Prior Publication Data

US 2016/0366222 A1  Dec. 15, 2016

Related U.S. Application Data

(63) Continuation of application No. 14/740,728, filed on Jun. 16, 2015, now Pat. No. 9,451,022, which is a
(Continued)

(51) Int. Cl.
  *H04L 29/08* (2006.01)
  *G06F 17/30* (2006.01)
  *H04L 29/06* (2006.01)

(52) U.S. Cl.
  CPC .... *H04L 67/1095* (2013.01); *G06F 17/30899* (2013.01); *H04L 67/02* (2013.01);
  (Continued)

(58) Field of Classification Search
  None
  See application file for complete search history.

(56) References Cited

U.S. PATENT DOCUMENTS 7,206,806 B2   4/2007  Pineau
8,060,486 B2  11/2011  Chatterjee et al.
(Continued)

FOREIGN PATENT DOCUMENTS

JP   2006-139632 A    6/2006
JP   2009-539167 A   11/2009
(Continued)

OTHER PUBLICATIONS

International Search Report dated Aug. 4, 2014, issued in corresponding International Application No. PCT/US2014/031500.
(Continued)

*Primary Examiner* — Thomas J Dailey
(74) *Attorney, Agent, or Firm* — Polsinelli PC

(57) ABSTRACT

A client device can implement a client-side application for a server-side online content management system. The client-side application can communicate with the server-side online content management system to sync data stored locally on the client-side with data stored on the server-side. A local web server can be implemented on the client device to work in conjunction with the client-side application, such that the local web server can access the data stored locally. The client device can run a web browser that communicates with the local web server. A user of the client device can use the web browser to connect to the local web server to access the synced data stored locally on the client-side. Advantages of accessing the data stored locally using the web browser via the local web server include performance improvements, offline access to the data, and use of native client applications to interact with the data.

20 Claims, 10 Drawing Sheets

Related U.S. Application Data continuation of application No. 13/849,165, filed on Mar. 22, 2013, now Pat. No. 9,088,573.

(52) U.S. Cl.
 CPC ............ *H04L 67/10* (2013.01); *H04L 67/306* (2013.01); *H04L 67/42* (2013.01)

(56) References Cited

U.S. PATENT DOCUMENTS

| | | |
|---|---|---|
| 8,938,790 B2 | 1/2015 | Kang et al. |
| 2003/0120685 A1 | 6/2003 | Duncombe et al. |
| 2005/0038893 A1 | 2/2005 | Graham |
| 2005/0050172 A1 | 3/2005 | Redpath |
| 2007/0033155 A1* | 2/2007 | Landsman ........ G06F 17/30899 |
| 2007/0033588 A1 | 2/2007 | Landsman |
| 2007/0276949 A1 | 11/2007 | Mergi et al. |
| 2008/0104277 A1 | 5/2008 | Tian |
| 2008/0281798 A1 | 11/2008 | Chatterjee et al. |
| 2009/0094332 A1 | 4/2009 | Schemers, III et al. |
| 2010/0153948 A1 | 6/2010 | Schreiber et al. |
| 2010/0235431 A1 | 9/2010 | Poluri et al. |
| 2011/0106880 A1 | 5/2011 | Strong et al. |
| 2013/0232121 A1 | 9/2013 | Tucker et al. |
| 2013/0346450 A1* | 12/2013 | Procopio ............. G06F 21/6218 707/783 |
| 2014/0258350 A1* | 9/2014 | Duval ............... G06F 17/30174 707/829 |

FOREIGN PATENT DOCUMENTS

| | | |
|---|---|---|
| JP | 2012-108889 A | 6/2012 |
| WO | 2009/054047 A1 | 4/2009 |

OTHER PUBLICATIONS

Office Action dated Mar. 20, 2014, issued in corresponding U.S. Appl. No. 13/849,165.

Office Action dated Nov. 21, 2014, issued in corresponding U.S. Appl. No. 13/849,165.

Notice of Allowance dated Jun. 16, 2015, issued in corresponding U.S. Appl. No. 13/849,165.

Dunn, Scott; "Dropbox File Sync Service," PC World, Jul. 31, 2008; accessed (<http://www.pcworld.com/article/149058/dropbox.html>).

* cited by examiner

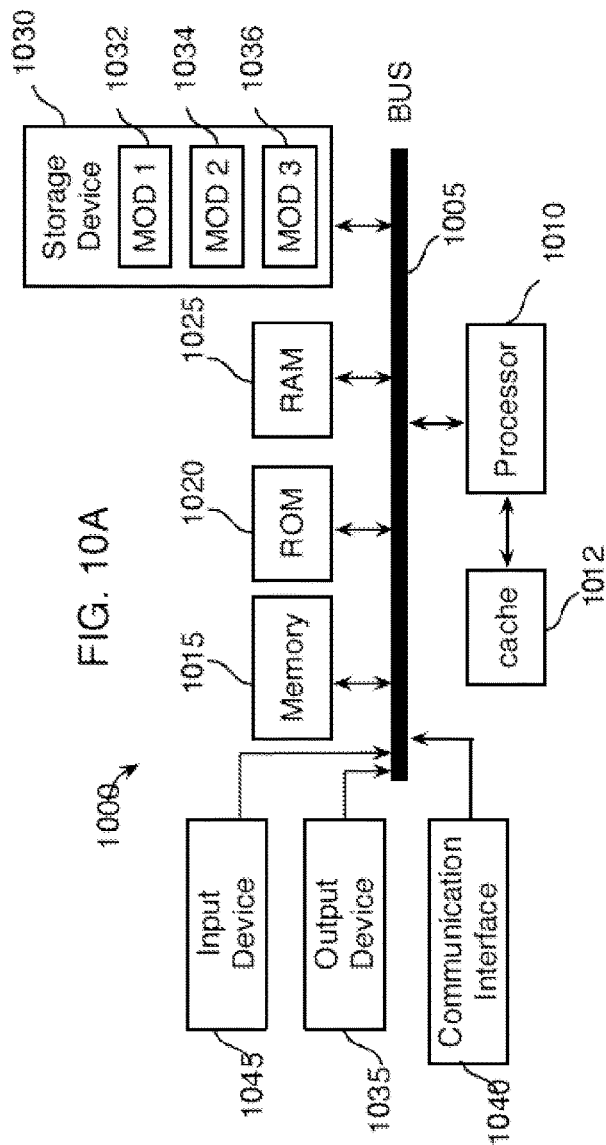
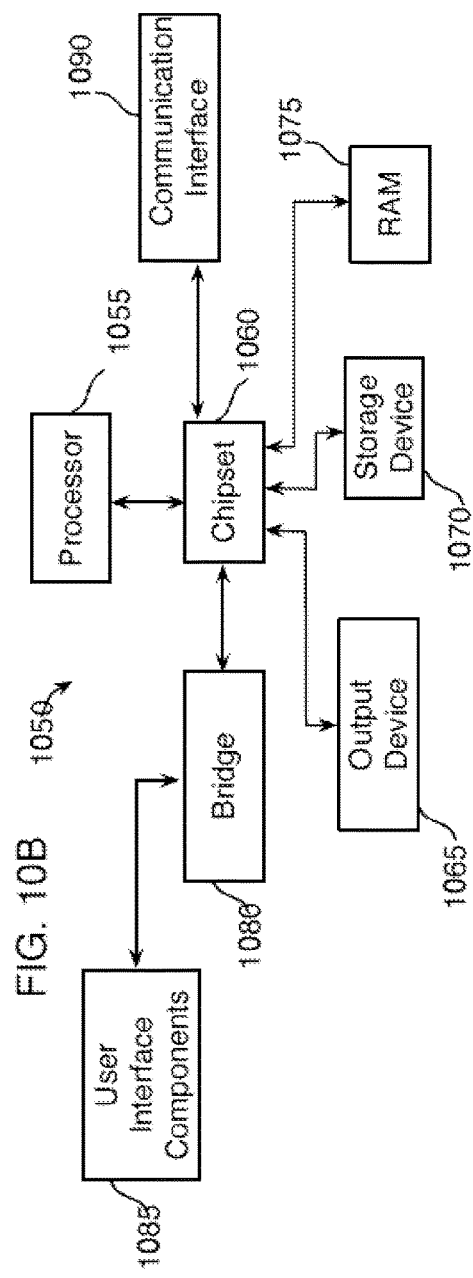
FIG. 10A
FIG. 10B

LOCAL SERVER FOR SYNCED ONLINE CONTENT MANAGEMENT SYSTEM

CROSS REFERENCE TO RELATED APPLICATIONS

This application is a continuation of U.S. patent application Ser. No. 14/740,728, entitled, "LOCAL SERVER FOR SYNCED ONLINE CONTENT MANAGEMENT SYSTEM", filed Jun. 16, 2015, which is a continuation of U.S. patent application Ser. No. 13/849,165, now U.S. Pat. No. 9,088,573, entitled, "LOCAL SERVER FOR SYNCED ONLINE CONTENT MANAGEMENT SYSTEM", filed Mar. 22, 2013; both of which are hereby expressly incorporated herein by reference in their entireties.

TECHNICAL FIELD

The present technology pertains to accessing synchronized data, and more specifically pertains to reading, accessing, or otherwise interacting with synchronized data using a local web server.

BACKGROUND

Computing devices and applications are becoming more commonplace. Every day, people use applications on their computing devices to access and interact with their data, especially as mobile computing devices and applications are growing in number and in function. Browsing applications are frequently used to navigate and access various data. Some people have data that is synced online at servers and locally on their devices. A user can store his data at an online server and have that data synced with local data on his computing device. For example, an email of the user can be stored online and also stored locally on his computing device. When the user deletes the email stored online, the same local version of the email can be deleted from his computing device. Likewise, when the user deletes the local email from his device, the online version of the email can be deleted as well.

In some cases, it can be convenient to use a browsing application to navigate or interact with data, such as to read the online version of the email in the previous example. However, accessing online data via the browsing application can be slow or unreliable depending on the network connection to the online data. If the network connection is slow, intermittent, or otherwise unreliable, the overall user experience associated with using browsing applications to interact with data can decrease.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a local server operable with a synchronized online content management system. Various embodiments of the present disclosure enable data to be stored and synchronized at both a local computing device and an online content management system.

In some embodiments, a client computing device can implement a client application corresponding to an online content management system. The client application can enable selected data (e.g., content items, files, folders, etc.) stored locally on the client computing device to be stored and synchronized at the online content management system. The synchronization process between the locally stored data (i.e., local data) and the data (i.e., online data) stored at the online content management system can occur at one or more specified times (e.g., at a schedule time, in response to a synchronization command, when data is modified, etc.).

In one example, the client computing device can be running a web browser. In this example, a user of the web browser can use the web browser to surf the Internet. During or after surfing, the user can decide to use the web browser to access one or more of his content items (e.g., files) stored at the online content management system. Since the browser is already open and being used by the user, it can be more convenient to the user to use the browser to access the online data than it would be to switch to a content navigation (e.g., file navigation) application to access local data (which is synchronized to the online data). However, the user experience associated with accessing online data using the web browser can vary depending on the speed and/or reliability of the network connection (e.g., Internet speed and/or availability).

The disclosed technology can implement a local server running on the client computing device. The local server can work in conjunction with the client application to access and/or interact with the locally stored data, which is also synchronized with the online data at the content management system. In some embodiments, the local server can be included with the implementation of the client application on the client computing device. Via the local server, a navigation application such as a browser can access and interact with the locally stored data, which is synchronized with the online data. Advantages of locally accessing the synchronized data via the local server using the navigation application include (but are not limited to) performance improvements, offline access to the data, and use of native client applications to interact with the data.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 10A and 10B show exemplary system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accessing or interacting with data that is synchronized with respect to a local computing device and an online content management system. The disclosed technology can enable a client device to implement a client-side application for a server-side online content management system. The client-side application can communicate with the server-side online content management system to synchronize data stored locally on the client-side with data stored on the server-side. A local web server can be implemented on the client device to work in conjunction with the client-side application, such that the local web server can access the data stored locally. The client device can run a web browser that communicates with the local web server. A user of the client device can use the web browser to connect to the local web server to access the synchronized data stored locally on the client-side. Advantages of accessing the data stored locally using the web browser via the local web server include performance improvements, offline access to the data, and use of native client applications to interact with the data.

Figure 1:
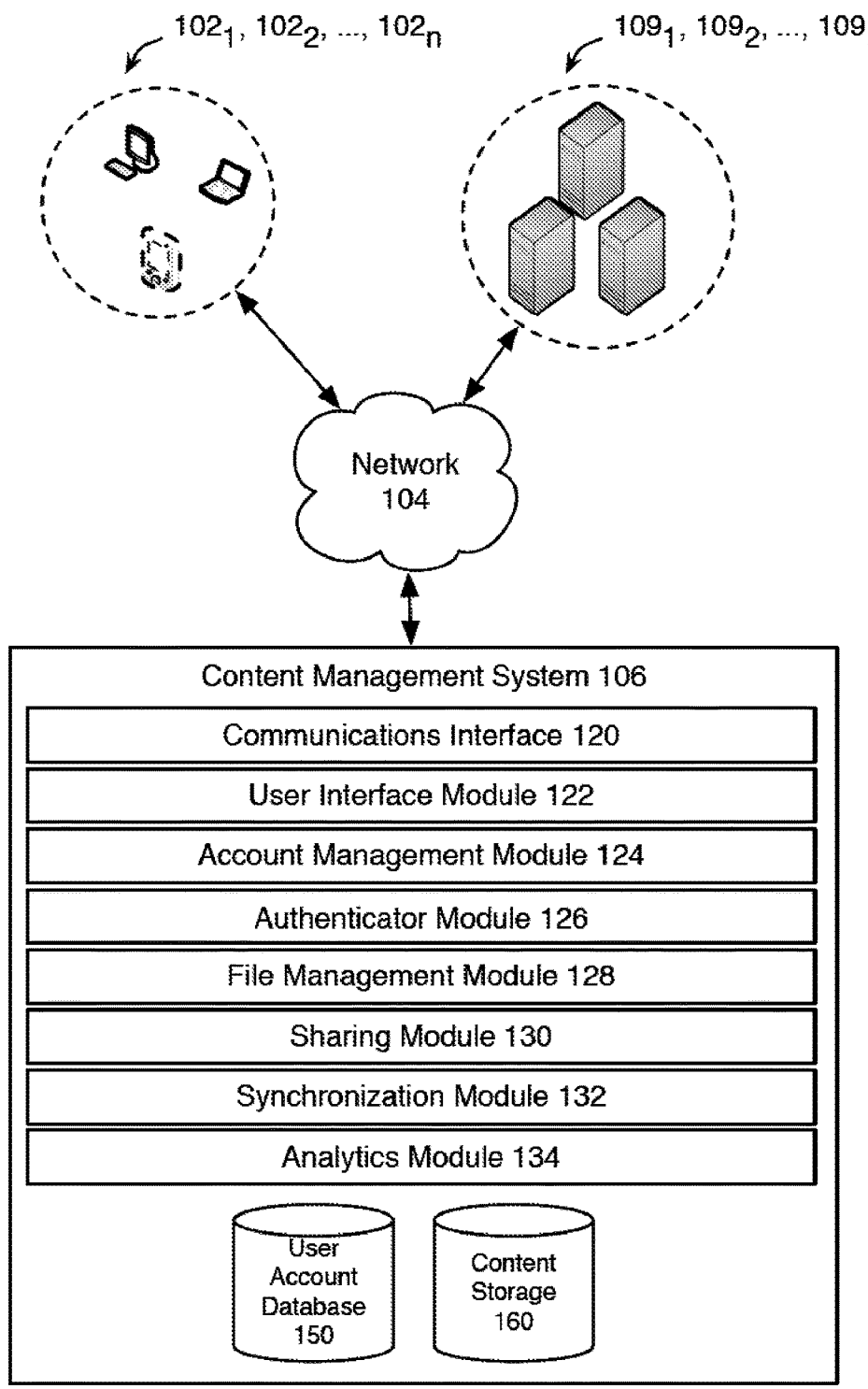
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store files more efficiently, as well as provide the ability to undo operations, by using a content item version control that tracks changes to files, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate content item operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true.

A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
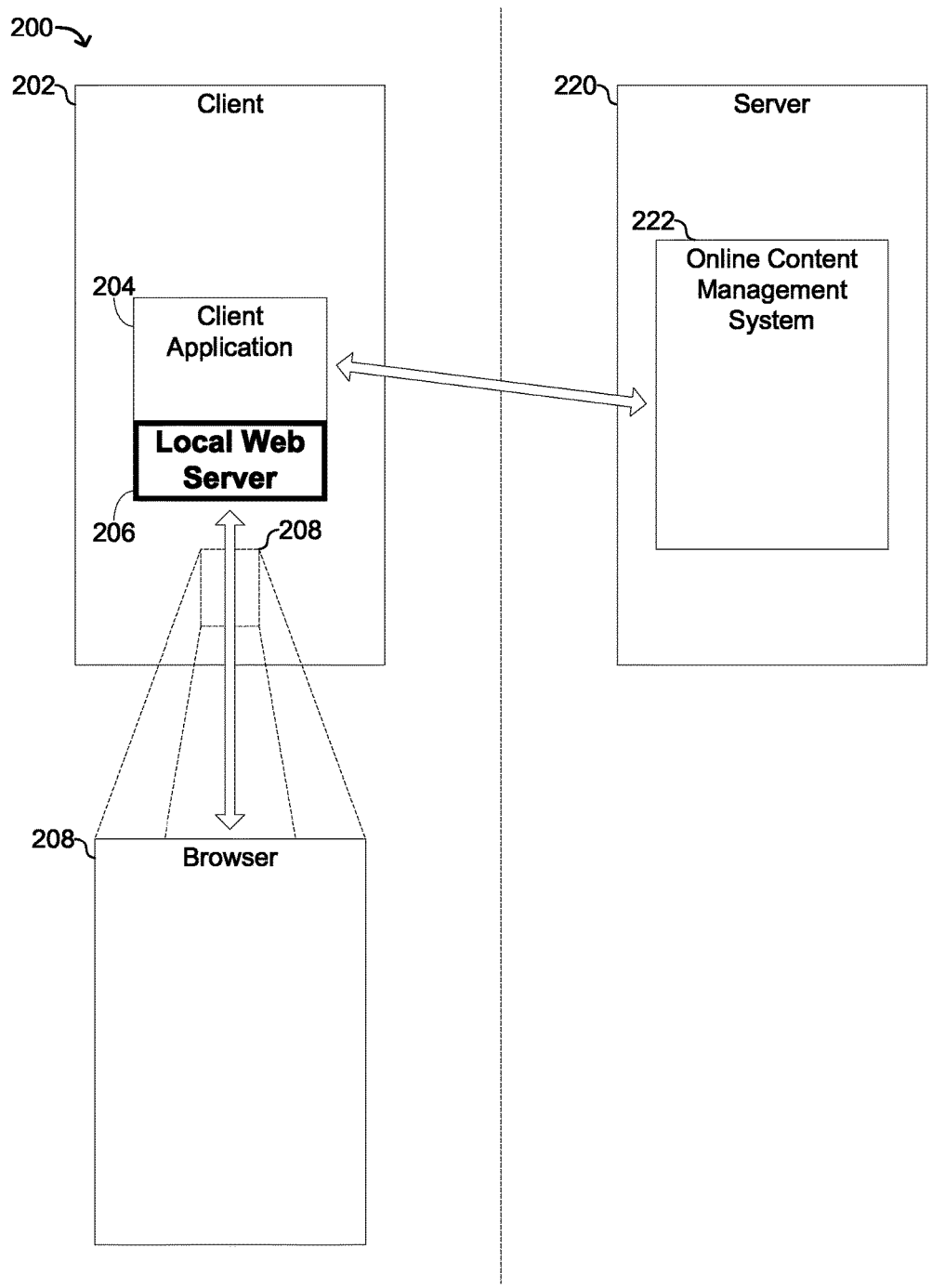
FIG. 2 shows an exemplary system embodiment for a local web server that is compatible with a synchronized online content management system.

With reference now to FIG. 2, FIG. 2 shows an exemplary system embodiment for a local web server that is compatible with a synchronized online content management system. Exemplary system 200 can include client computing device 202 (i.e., client device, client, etc.) and one or more servers 220 external to client computing device 202. Client device 202 can be running client-side application 204 (i.e., client application). Client device 202 can also be running local web server 206. Local web server 206 can be included with or can work in conjunction with client application 204. Moreover, client computing device 202 can be running a navigation application, such as a content/file navigation application or web browser 208.

In some embodiments, client application 204 can be configured to communicate with online content management system 222 (e.g., content management system 106 in FIG. 1) that is running on one or more servers 220. Client application 204 can communicate with content management system 222 over a network, such as the Internet. Client application 204 can communicate with content management system 222 to sync data stored locally (i.e., local data) on client device 202 with data (i.e., online data) stored at content management system 222. For example, particular pieces or portions of data stored locally on client 202 can be synced with respective pieces or portions of data stored at content management system 222. Accordingly, content items (e.g., files) and/or other information can be stored and synced at both content management system 222 and client device 202. In some embodiments, the synchronization between the data stored locally on client 202 and the data stored at content management system 222 can occur at one or more specified times, such as at a specified time on a daily basis or at a time specified by a synchronization policy (e.g., whenever a threshold percentage of data has been modified).

Figure 3:
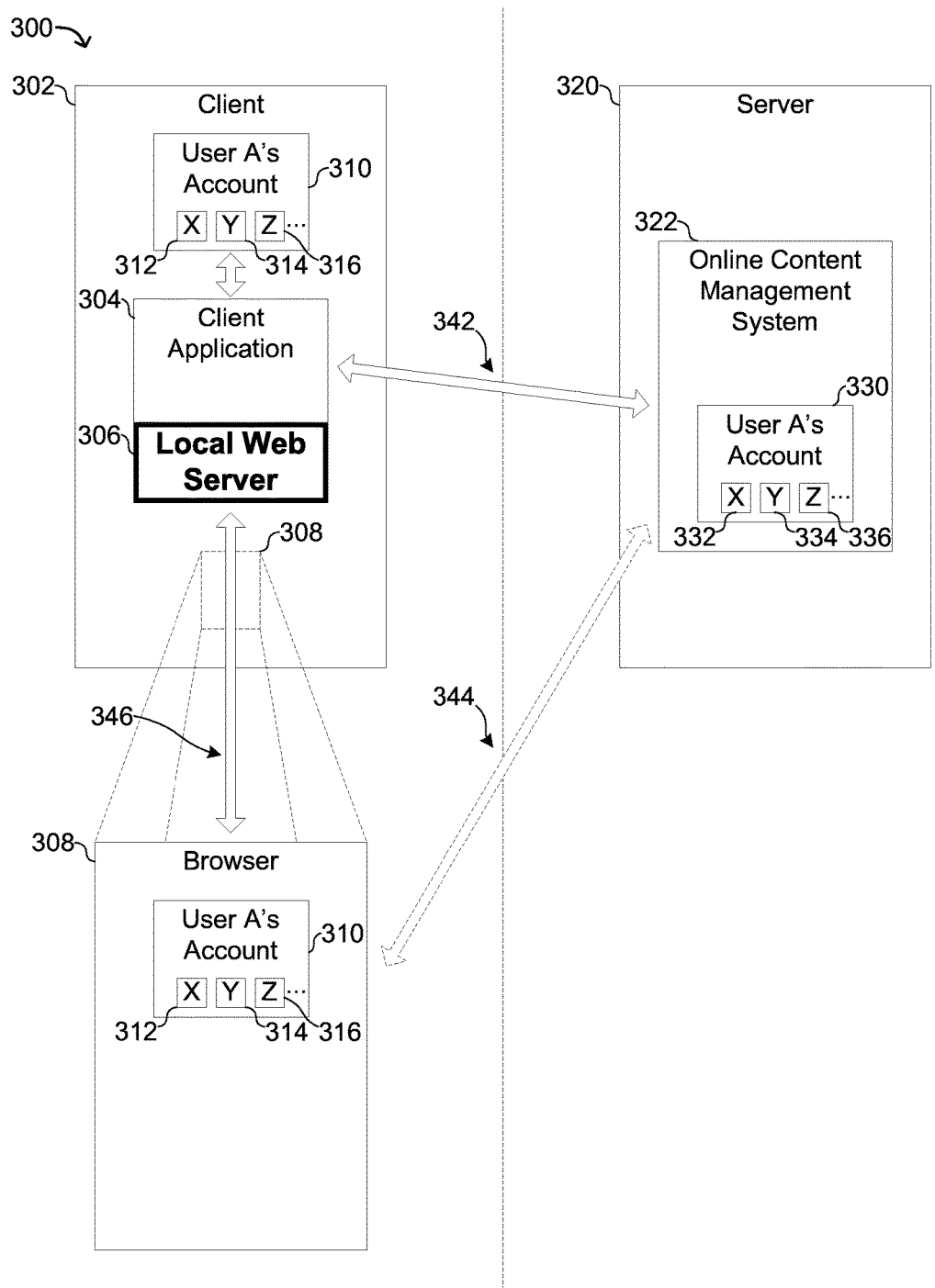
FIG. 3 shows an exemplary system embodiment for a local web server that is compatible with a synchronized online content management system.

FIG. 3 shows an exemplary system embodiment for a local web server that is compatible with a synchronized online content management system. Exemplary system embodiment 300 can include client 302 and at least one server 320. Client 302 can be running client application 304 and local web server 306. Client 302 can also be running a navigation application, such as browser 308. One or more servers, such as server 320, can be used to host online content management system 322.

In some embodiments, online content management system 322 can store data associated with users or other entities. For example, online content management system 322 can be configured to include accounts for a plurality of users, each respective account storing data for a respective user (e.g., User A). As shown in FIG. 3, User A's account 330 with online content management system 322 can include data such as content item X 332 (e.g., file X), content item Y 334, content item Z 336, and so forth.

User A can run client-side application 304 that is compatible with online content management system 322. Client application 304 can be configured to communicate 342 with content management system 322. Via communication 342, client application 304 can sync local data associated with User A's local account 310 and data stored under User A's account 330 at content management system 322. For example, local content items (e.g., files) X 312, Y 314, and Z 316 can be synced, respectively, with content item X 332, content item Y 334, and content item Z 336 stored at content management system 322. In some embodiments, User A's local account 310 can be a directory on client device 302. Content items, files, and/or other data placed in the directory for User A's local account 310 on client 302 can be synced with data included in User A's account 330 on content management system 322.

As shown in FIG. 3, client application 304 can interact with data stored locally (e.g., content item X 312, content item Y 314, content item Z 316, etc.) under User A's account 310. In some embodiments, local web server 306 can also interact with the data stored locally, such as by interacting with the local data via client application 304.

Browser 308 can access local web server 306 to interact with the data stored locally (e.g., content item X 312, content item Y 314, content item Z 316, etc.). Browser 308 can function as a navigational tool to view, read, browse, or otherwise interact with the local data (e.g., content item X 312, content item Y 314, content item Z 316, etc.). As shown in FIG. 3, through communication 346, browser 308 can access local web server 306 to interact with the local data.

In some embodiments, accessing data (e.g., 332, 334, 336) at content management system 322 via connection 344 can serve as a back-up or alternative to accessing the local data (e.g., 312, 314, 316) via local web server 306 and connection 346. Accessing the locally stored data (synced with the data at content management system 322) via local web server 306 can offer several advantages over using the connection 344 (e.g., Internet connection) to access the data at content management system 322. These advantages can include (but are not limited to) improved performance, offline access to data, and the ability to utilize native applications for interacting with certain data.

Figure 4:
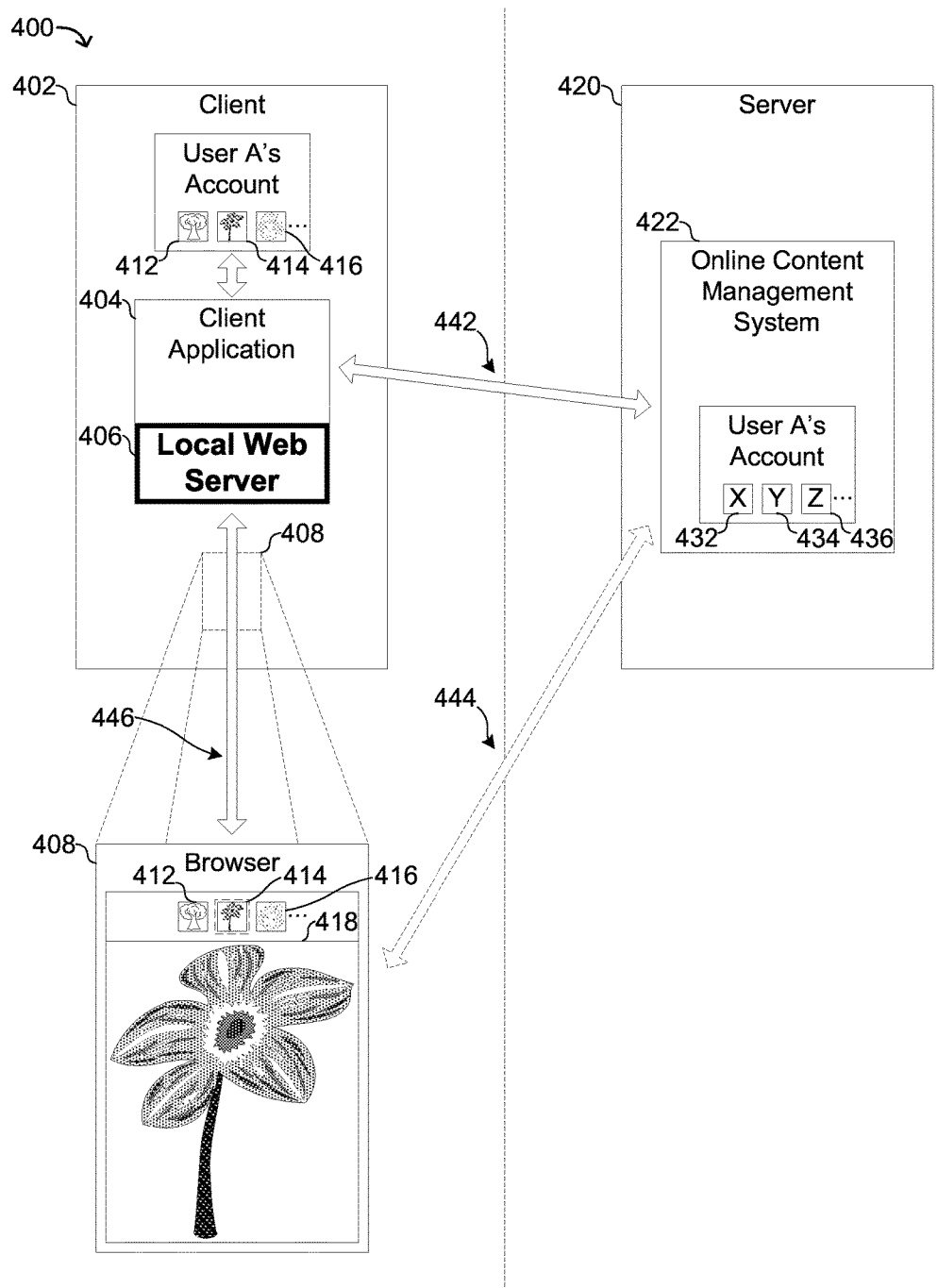
FIG. 4 shows an exemplary system embodiment for accessing data using a local web server that is compatible with a synchronized online content management system.

FIG. 4 shows an exemplary system embodiment for accessing local data using a local web server that is compatible with a synchronized online content management system. Exemplary system embodiment 400 can include a client 402 and one or more servers, such as server 420. In FIG. 4, client application 404 and local web server 406 can be running on client device 402 and can interact with locally stored data (e.g., 412, 414, 416). Browser 408 can also be running on client device 402 and can access local web server 406 to interact with the local data (e.g., 412, 414, 416) via connection 446. Moreover, client application 404 can communicate 442 with content management system 422 to sync the local data with the data at content management system 422. For example, local content items 412, 414, and 416 can be synced, respectively, with content items 432, 434, and 436 at content management system 422.

As discussed above, one advantage of accessing synced local data via local web server 406 is improved performance. Improved performance can include faster interaction and/or operation with the local data. For example, the speed of opening content item 414 can be significantly increased when content item 414 is opened from browser 408 via local web server 406 and client application 404, as compared to opening content item 434 (synced with content item 414) from browser 408 via web connection 444. As shown in FIG. 4, content item 414 (as well as synchronized content item 434) can be an image file. Locally opening full resolution version 418 of image content item 414 via local web server 406 can be significantly faster than opening image content item 434 from online content management system 422. Local connections (e.g., 446) can have significantly less latency issues than other network connections (e.g., 442, 444).

In another example, improved performance can include generating previews for data. As shown in FIG. 4, content items 412, 414, and 416 can be image files. As such, thumbnails can be generated for image files 412, 414, and 416. The generating and displaying of the previews (e.g., thumbnails) can be performed more efficiently on client device 202 as compared to generating previews at online content management system 422 and then transmitting the previews from content management system 422 to client 402 for display. The generating of the thumbnails for local data can be performed using computing resources of client computing device 402.

Figure 5:
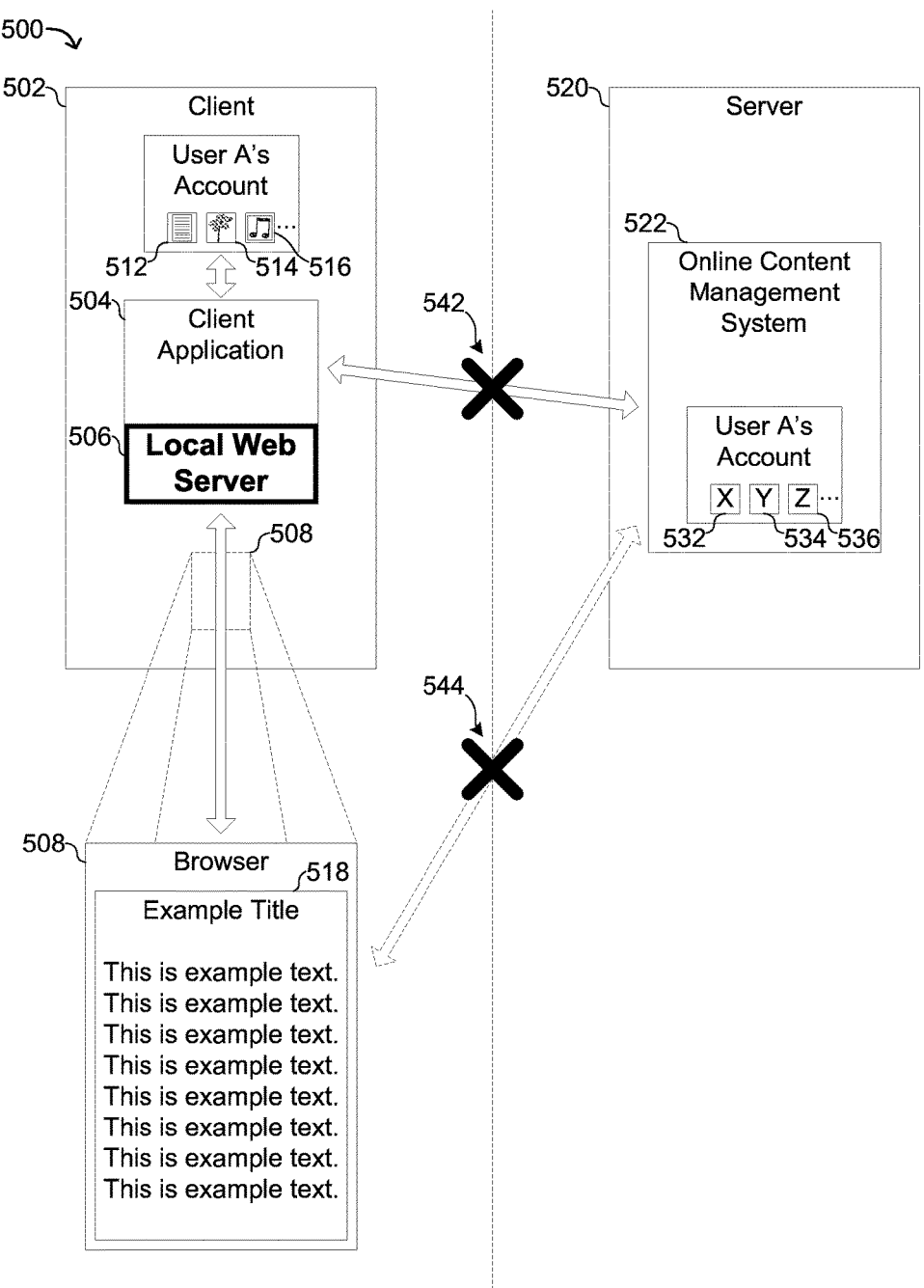
FIG. 5 shows an exemplary system embodiment for accessing data using a local web server when a client computing device is unable to communicate with a synchronized online content management system.

FIG. 5 shows an exemplary system embodiment for accessing data using a local web server when a client computing device is unable to communicate with a synchronized online content management system. In exemplary system embodiment 500, client 502 can implement client application 504, local web server 506, and browser 508. Server 520 can host content management system 522.

As discussed above, another advantage of accessing local data is that a user can still have access to the data when there is no network connection (e.g., 542, 544) to content management system 522. In other words, accessing data (e.g., 532, 534, 536) stored at content management system 522 can only occur when client 502 can connect to content management system 522. An advantage of accessing local data is that the data can still be accessed when the Internet is unavailable or disabled (e.g., 542, 544). In one example, a user can board a plane that does not provide wireless Internet. During the flight, the user can decide to read a document (e.g., 512 on client 502, 532 on content management system 522). Using browser 508 to access local web server 506, the user can read the document (e.g., 512 on client 502) even though there is no Internet available during the flight.

In another example (not shown in FIG. 5), the user can be listening to a music file that is synced on client 502 as file 516 and on content management system 522 as file 536. If the user plays file 536 on content management system 522 via browser 508, and if the connection between browser 508 and content management system 522 is lost 544, then the playing of file 536 can be interrupted. In contrast, if the user plays local file 516 on browser 508 via local web server 506, then the playing of file 516 can continue even if there is no connection (e.g., 542, 544) to content management system 522.

Figure 6:
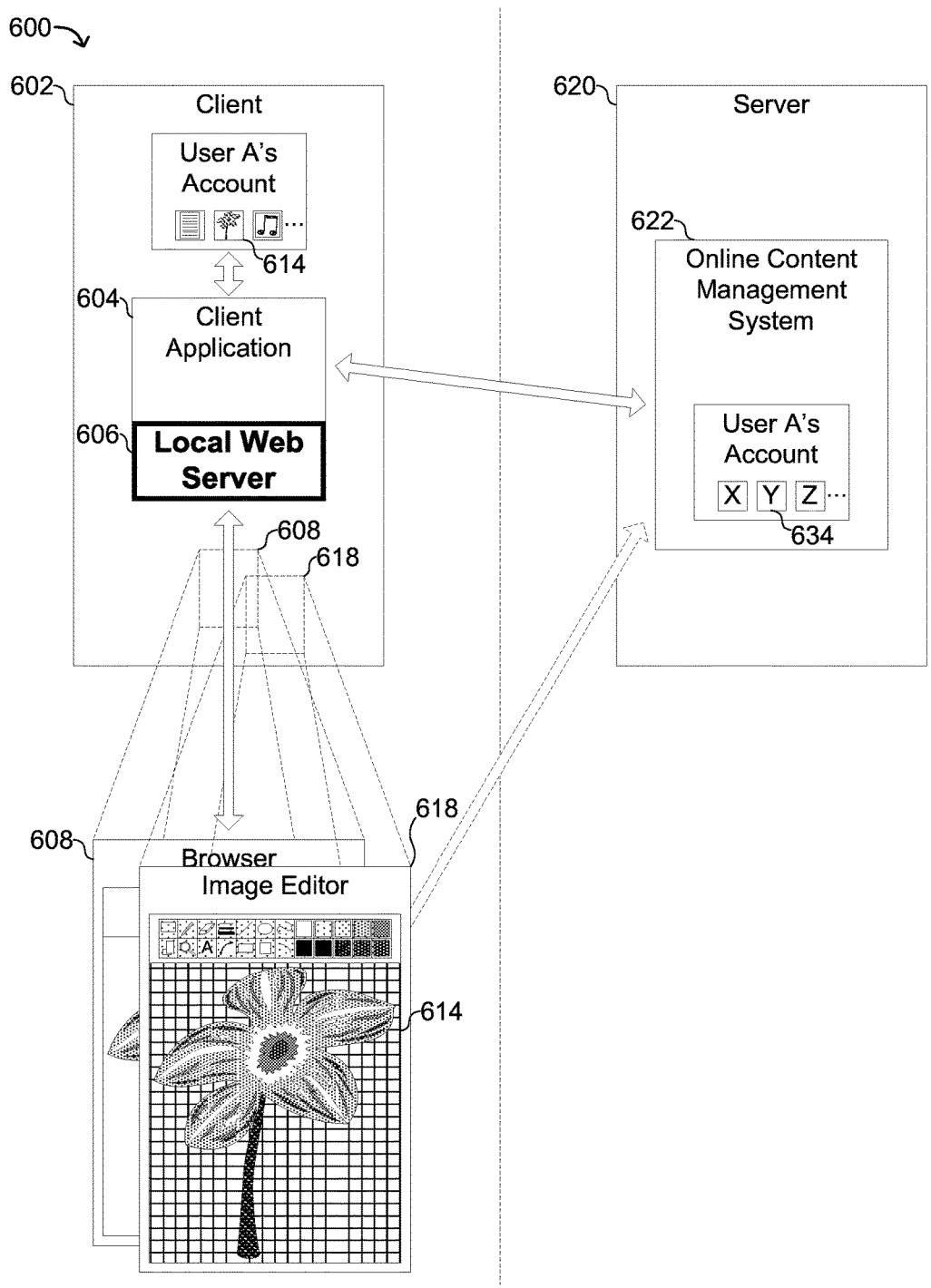
FIG. 6 shows an exemplary system embodiment for accessing data using a local web server to execute an application configured to operate with the data.

FIG. 6 shows an exemplary system embodiment for accessing data using a local web server to execute an application configured to operate with the data (i.e., native application). Typically, web applications cannot communicate with device operating systems. Accordingly, opening a content item, such as a file (e.g., 634), at online content management system 622 is typically limited to only using certain web applications to open the content item, rather than using native applications to open the content item. For example, opening image file 634 at content management system 622 using browser 608 can be limited to executing an image viewer included with or embedded in browser 608 to open image file 634.

In exemplary system embodiment 600, local web server 606 and client application 604 are implemented on client device 602 such that local web server 606 and/or client application 604 can communicate with the operating system of client 602. It follows that browser 608 can access local web server 606 and/or client application 604 to communicate with the operating system of client 602. Local web server 606 and/or client application 604 can ask the operating system which applications are native to a particular piece of data. As such, another advantage of locally accessing synced data is that the data can be interacted with and/or manipulated using native applications or applications that are configured to be operated with the data.

In one example, browser 608 can navigate to image file 614 via local web server 606. From browser 608, an instruction can be sent via local web server 606 to select which native application to use to open image 614 (e.g., an option to "Open With . . . " with respect to file 614). The instruction can correspond, for example, to a right click of a mouse with respect to an icon representing file 614. Image editor 618 can be included among those native applications installed on client 602. A command initiated from browser 608 can cause image editor 618 (i.e., native application, application configured particularly for file 614 or for a file type associated with file 614) to open file 614. Opening image file 614 using image editor 618 can provide a richer or otherwise better experience than compared to opening image 634 at content management system 622 with a simpler web image viewer application.

Figure 7:
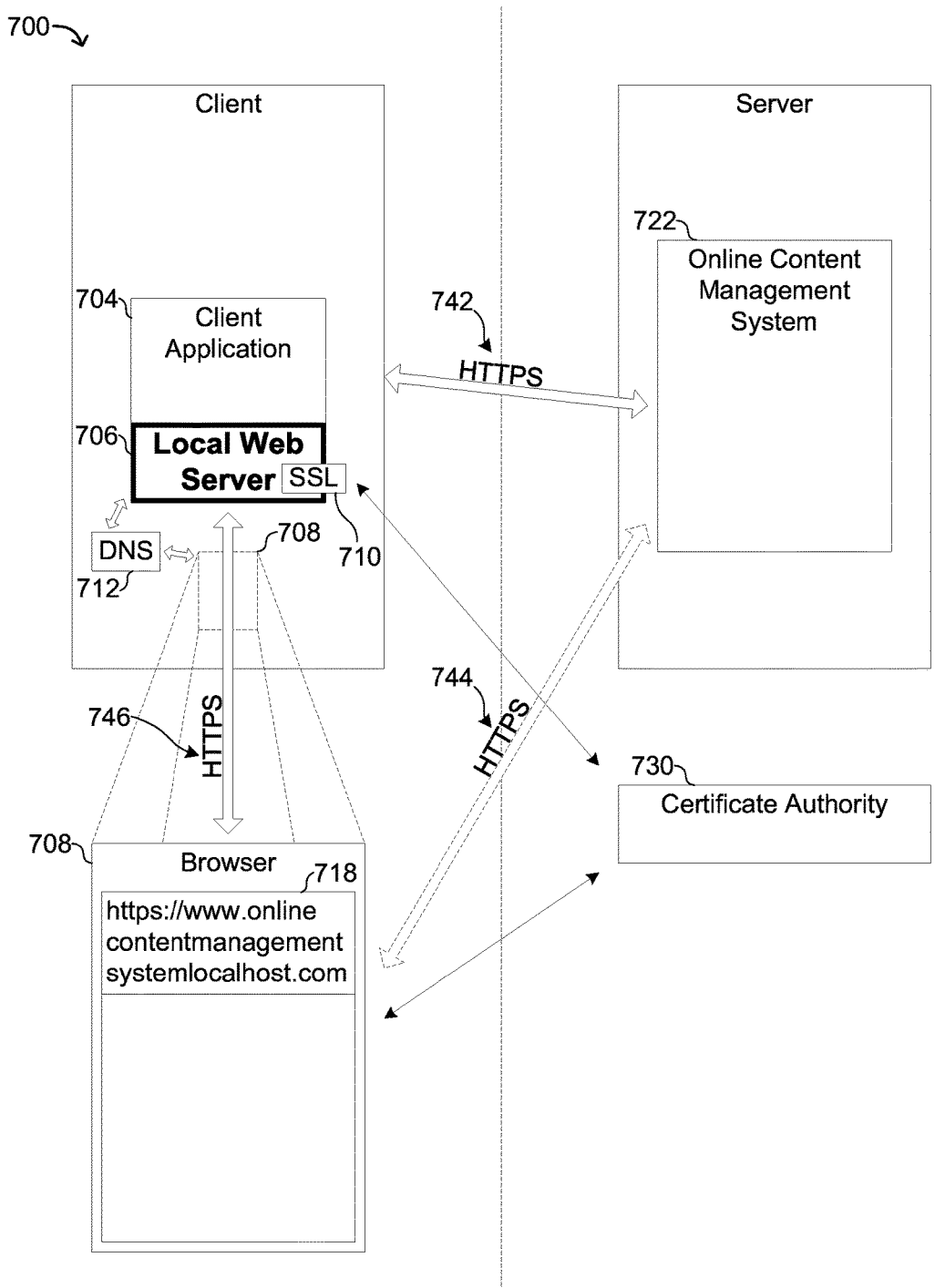
FIG. 7 shows an exemplary system embodiment for securely communicating among a local web server, a client computing device, and a synchronized online content management system.

FIG. 7 shows an exemplary system embodiment for securely communicating among a local web server, a client computing device, and a synchronized online content management system. Communications among local web server 706, browser 708, and content management system 722 can correspond, for example, to hypertext transfer protocol secure (HTTPS) connections (e.g., 742, 744, 746), as shown in exemplary system embodiment 700. However, due to the HTTPS scheme, browser 708 cannot access local web server 706 by going to target address "https://localhost" because the HTTPS scheme can require a security key, such as a secure sockets layer (SSL) certificate.

In some embodiments, a domain name for online content management system 722 can be created, such as "https://www.onlinecontentmanagementsystemlocalhost.com" 718. In order for local web server 708 to accept HTTPS connections, there must be a public key certificate for local web server 708. The certificate must be signed by a trusted certificate authority 730 in order for browser 708 to accept the certificate without warning. Certificate authority 730 can certify or verify that the certificate holder (e.g., domain 718) is indeed the operator of the web server (e.g., local web server 708) that presents the certificate.

In FIG. 7, local web server 706 can be set up with SSL certificate 710, which can be prepared, for example, by an administrator of content management system 722. SSL certificate 710 can be verifiable with certificate authority 730. In one example, in order to access local web server 706, browser 708 can go to domain "https://www.onlinecontentmanagementsystemlocalhost.com" 718 (which can also be prepared or set up by an administrator of content management system 722). Domain name "https://www.onlinecontentmanagementsystemlocalhost.com" 718 can be configured to resolve to the loopback Internet protocol (IP) address (e.g., 127.0.0.1), which points back to local web server 706. Browser 708 can verify with certificate authority 730 that SSL certificate 710 of local web server 706 is valid. Then HTTPS connection 746 can be established such that browser 708 can access local web server 706 via domain name "https://www.onlinecontentmanagementsystemlocalhost.com" 718.

In some embodiments, an entry for domain name 718 can be stored in local domain name service (DNS) 712. This can allow browser 708 to resolve domain name 718 to the loopback IP address even when there is no Internet connection. In one example, the entry for domain name 718 can be configured to have a long time to live (TTL) to further ensure or increase the likelihood that browser 708 will be able to resolve domain name 718 to the loopback IP address.

Furthermore, in some embodiments, client application 704 can include a content item (e.g., file) that specifies to browser 708 where domain 718 resolves to. For example, client application 704 can configured to include an ASCII file specifying that domain name 718 resolves to the loopback IP address (e.g., 127.0.0.1), which points back to local web server 706.

Figure 8:
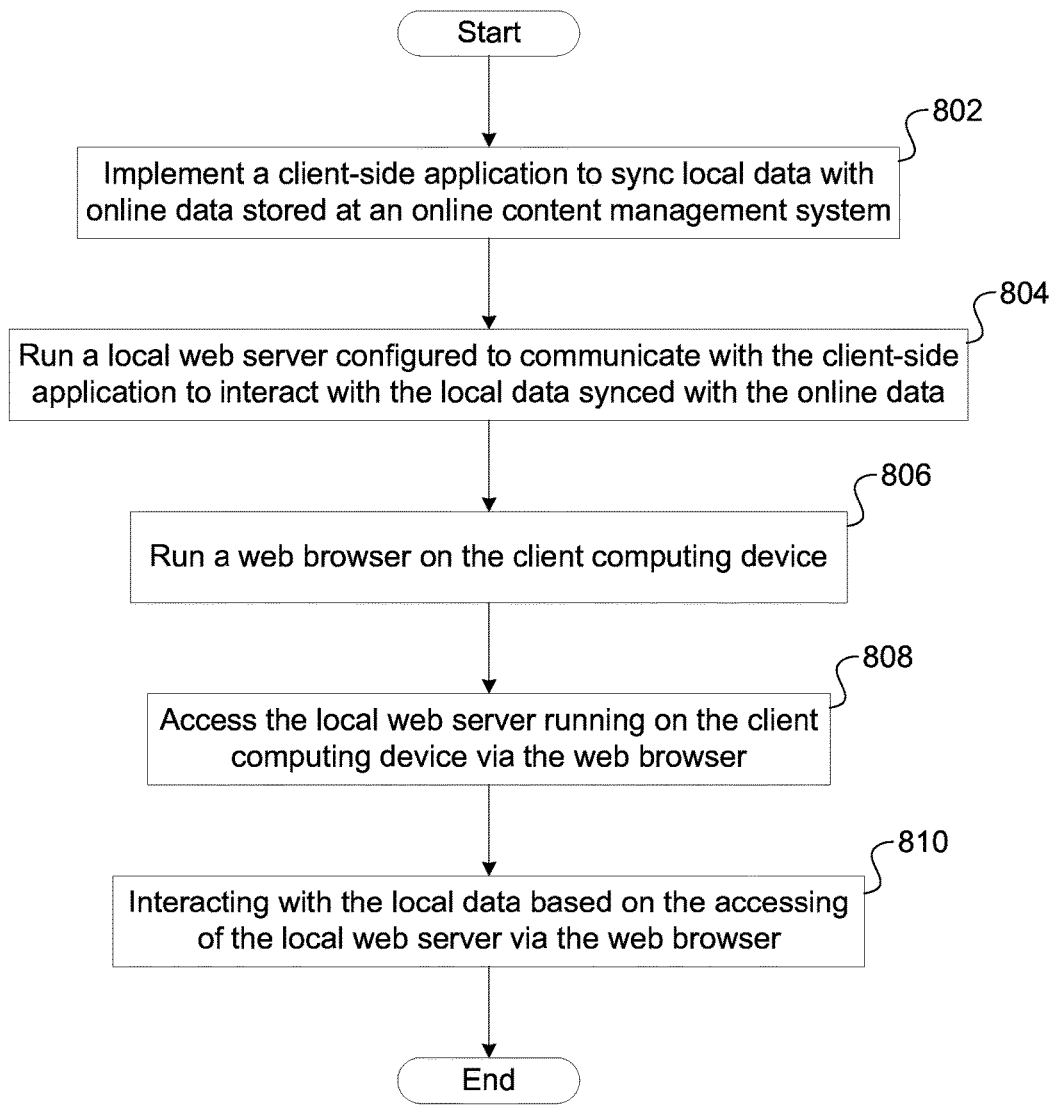
FIG. 8 shows an exemplary method embodiment for using a local web server that is compatible with a synchronized online content management system.

FIG. 8 shows an exemplary method embodiment 800 for using a local web server that is compatible with a synchronized online content management system. It should be understood that there can be additional, fewer, or alternative steps performed in similar or alternative orders, or in parallel, within the scope of the various embodiments unless otherwise stated. The method embodiment 800 can begin with implementing a client-side application that communicates with an online content management system, at step 802. The client-side application can be implemented on a client computing device. The client-side application can communicate with the content management system to sync data stored locally on the client computing device with data stored at the online content management system.

At step 804, the method 800 can run a local web server on the client computing device. The local web server can be configured to communicate with the client-side application to interact with at least a portion of the data stored locally. As mentioned above, the data stored locally can be synced with the data stored at the online content management system. Step 806 can include running a web browser on the client computing device. In some embodiments, any application with web browsing capabilities can be utilized. In some embodiments, an application with content/file navigation capabilities can be utilized.

Then the method 800 can access the local web server running on the client computing device via the web browser, at step 808. Step 810 can include interacting with the at least a portion of the data stored locally. The interacting with the at least a portion of the data stored locally can be based, at least in part, on the accessing of the local web server via the web browser. For example, the web browser can access the local web server to open a locally stored content item (e.g., file) significantly more efficiently than it would be for the web browser to open the synchronized online version of the content item at the online content management system.

Figure 9:
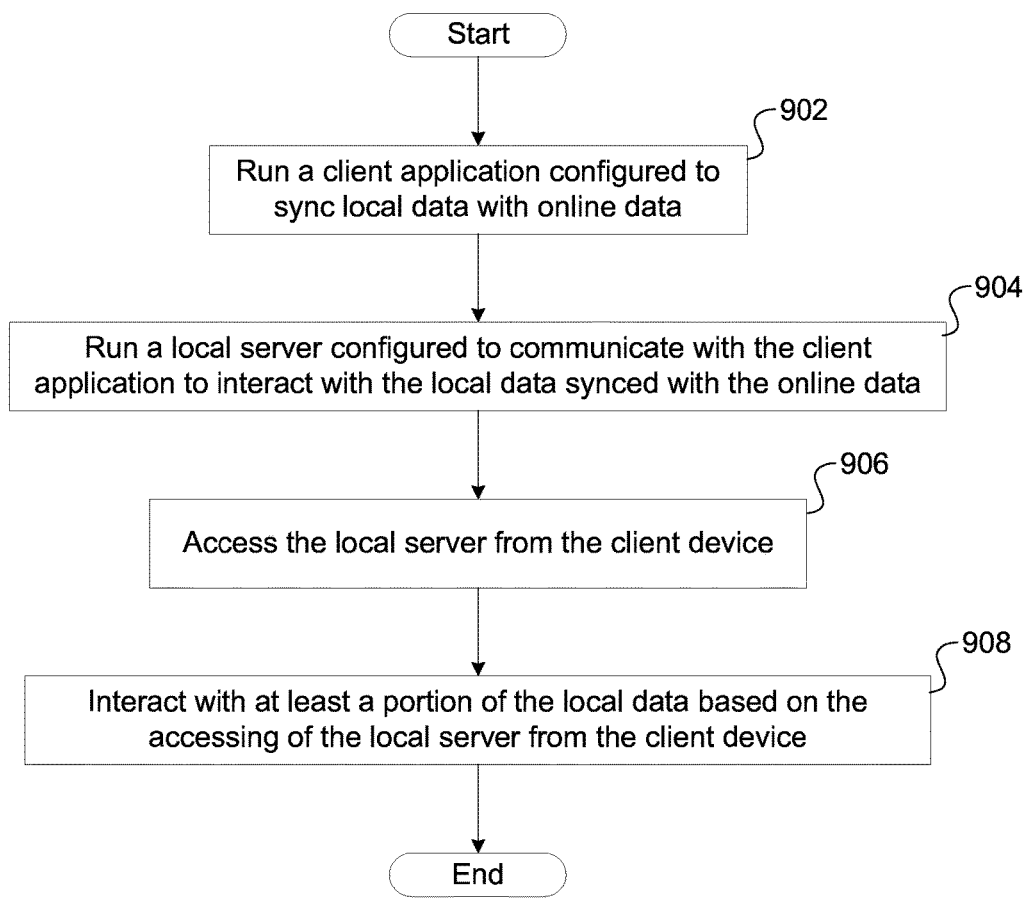
FIG. 9 shows an exemplary method embodiment for using a local web server that is compatible with a synchronized online content management system.

FIG. 9 shows an exemplary method embodiment 900 for using a local web server that is compatible with a synchronized online content management system. Again, it should be understood that there can be additional, fewer, or alternative steps performed in similar or alternative orders, or in parallel, within the scope of the various embodiments unless otherwise stated. At step 902, the exemplary method embodiment 900 can run a client application configured to sync local data on the client device with data on an online content management system. The client application can be run on a client device. At step 904, the exemplary method embodiment 900 can run a local server configured to communicate with the client application to interact with the local data. The local server can be run on the client device. The local data can be synced, at one or more specified times, with the online data at the online content management system.

Then the exemplary method 900 can access the local server from the client device, at step 906. In some embodiments, the local server can be accessed from a navigation application, such as a browsing application, that is running on the client device. Step 908 can include interacting with at least a portion of the local data. The interaction can be based, at least in part, on the accessing of the local server from the client device (e.g., from a navigation application running on the client device).

In some embodiments, a request to access or interact with a piece of synced data (local data or online data) can be initiated with respect to the local web server and the online content management system simultaneously. The request can be satisfied from whichever source responds first (typically the local web server).

As discussed above, the synchronization of local data and online data can occur at one or more specified times. In some embodiments, during times of synchronization, the browser can access the online data stored at the online content management system. In one example, the browser can request a content item from the client device. The client device can inform the browser that the content item is in the process of being synced (e.g., updated). As such, the browser can access the content item from the online content management system.

In some embodiments, various embodiments of the present disclosure can also enable one or more settings, options, or preferences to be changed via the browser. For example, the browser can change settings associated with a selective sync option for the client application, which specifies which content items, files, and/or folders are to be synchronized for the client device. In another example, the browser can change settings that are associated with a unified interface for the client application and the online content management system.

In some embodiments, various embodiments of the present disclosure can also enable the local web server and/or client application to function as a content delivery network (CDN). In one example, website data (e.g., HTML files, CSS files, JavaScript files, webpage images, etc.) for the online content management system can be included with the client application. When the browser accesses the local web server, an interface similar to the website for the online content management system can be presented in the browser. Moreover, when the browser needs to access the website for the online content management system, the browser can load the website much fasters since the website data is stored locally. Additionally, whenever the website data for the online content management system is changed, the updated website data can be included in the client application (e.g., as an update for the client application).

In some embodiments, interactions with the local data via the local web server can include "read-only" interactions, such as viewing and playing content item (e.g., files). In some embodiments, "write" interactions with respect to the local data, such as sharing content items and modifying file contents, can be achieved using network connections to the online content management system. In one example, the client application can only share a file by opening the browser to a link at the online content management system to share the file. However, in accordance with the present disclosure, the browser can integrate access to the online content management system to share the file with the advantages of locally accessing synced data.

Various embodiments of the present disclosure can also be implemented with various online services/systems that have client-side correspondences. For example, an online media streaming service can have a client-side application. Media (e.g., music, videos, etc.) stored online and locally can be synced. Utilizing a local web server to access the locally stored media (which can be synced to the online media) can offer various advantages, similar to the ones discussed above.

It is further contemplated that a person of ordinary skill in the art would recognize other approaches or variations that can be implemented consistent with the scope of the present disclosure. For example, in some embodiments, the local web server and/or client application can be implemented as a web browser extension. In another example, the local web server and/or client application can enable one or more computing tasks to be performed using computing resources of the client device, thereby reducing resources needed by the online content management system.

With reference now to FIG. 10A, and FIG. 10B, FIG. 10A, and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RANI 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium storing computer-readable instructions which, when executed by a computing system, cause the computing system to:
   receive, by a local web server running on the computing system, from a web browser application on the computing system, a request to access content associated with a user account registered at a content management system, the content being stored at the content management system;
   in response to the request, determine, by the local web server, whether to serve a local copy of the content to the web browser application or direct the web browser application to access the content from the content management system based on at least one of a type of access requested, a network connectivity state associated with the computing system, or synchronization activity between a client-side application on the computing system and the content management system, the local copy being stored at the computing system by the client-side application and synchronized via bidirectional synchronization between the client-side application and the content management system; and in response to determining to serve the local copy of the content to the web browser application:
  obtain, by the local web server, the local copy of the content; and
  provide, by the local web server to the web browser application, the local copy of the content.

2. The non-transitory computer-readable medium of claim 1, storing computer-readable instructions which, when executed by the computing system, cause the computing system to:
  communicate, by the local web server, a second request to the client-side application for the local copy of the content.

3. The non-transitory computer-readable medium of claim 1, storing computer-readable instructions which, when executed by the computing system, cause the computing system to:
  receive, by the local web server, from the web browser application, a second request to access a content item in the content;
  based on the type of access requested by the second request, determine whether to provide the web browser application wish a respective local copy of the content item via the local web browser or direct the web browser application to access the content item from the content management system.

4. The non-transitory computer-readable medium of claim 1, storing computer-readable instructions which, when executed by the computing system, cause the computing system to:
  receive, by the local web server, a second request from the web browser application for an identification of a native application on the computing system that is compatible with a file type of the local copy of the content.

5. The non-transitory computer-readable medium of claim 4, storing computer-readable instructions which, when executed by the computing system, cause the computing system to:
  in response to the second request for the identification of the native application, send, to the web browser application, the identification of the native application; and
  receive, from the web browser application, a selection of the native application, the selection requesting access to the local copy of the content via the native application.

6. The non-transitory computer-readable medium of claim 5, storing computer-readable instructions which, when executed by the computing system, cause the computing system to:
  receive a modification to the local copy of the content from the native application; and
  synchronize the modification with a remote copy of the content stored at the content management system.

7. The non-transitory computer-readable medium of claim 1, storing computer-readable instructions which, when executed by the computing system, cause the computing system to:
  receive, by the local web server, from the web browser application, a second request to access a content item associated with the user account;
  determine whether the second request comprises a read operation or a write operation; and provide, by the local web server to the web browser application, a respective local copy of the content item only when the second request comprises the read operation.

8. The non-transitory computer-readable medium of claim 1, storing computer-readable instructions which, when executed by the computing system, cause the computing system to:
  receive, by the local web server, from the web browser application, a second request to access a content item associated with the user account;
  determine whether the client-side application is synchronizing with the content management system; and
  when the client-side application is synchronizing, send, to the web browser application, an indication that local access to the content item is unavailable.

9. The non-transitory computer-readable medium of claim 1,
  wherein the local web server stores website data associated with an online website of the content management system, and
  wherein providing the local copy of the content comprises providing an interface mirroring one or more elements from the online website of the content management system based on the website data.

10. A computing system comprising:
one or more processors; and
at least one computer-readable storage medium storing:
  a client-side application comprising instructions that, when executed by the one or more processors, cause the client-side application to store locally on the computing system content synchronized between the client-side application and a content management system associated with the client-side application;
  a local web server associated with the client-side application and the content management system, the local web server comprising instructions that, when executed by the one or more processors, cause the local web server to:
    receive, from a web browser application on the computing system, a first request to access a content item from the content synchronized between the client-side application and the content management system;
    determine whether to provide the web browser application access to a local copy of the content item or direct the web browser application to access the content item from the content management system, based on at least one of a type of access requested, a network connectivity state associated with the computing system, or synchronization activity between the client-side application and the content management system;
    in response to determining to provide the web browser application access to the local copy of the content item, communicate a second request to the client-side application for the local copy of the content item;
    based on the second request, obtain, from the client-side application, the local copy of the content item; and
    provide, to the web browser application, the local copy of the content item.

11. The computing system of claim 10, wherein the local web server comprises instructions that, when executed by the one or more processors, cause the local web server to:

receive, by the local web server, from the web browser application, a third request to access a second content item;

determine whether the third request comprises a read operation or a write operation; and provide, by the local web server to the web browser application, a second local copy of the second content item only when the third request comprises the read operation.

12. The computing system of claim 10, wherein the second request for the local copy of the content item specifies a local application to open and display the content item, the local application being based on a file type associated with the content item.

13. The computing system of claim 12, wherein the client-side application comprises instructions that, when executed by the one or more processors, cause the client-side application to detect that the local copy of the content item has been edited by the local application.

14. The computing system of claim 10, wherein the local web server comprises instructions that, when executed by the one or more processors, cause the local web server to:

receive, from the web browser application, a third request to access a second content item;

determine whether the client-side application is synchronizing with the content management system; and when the client-side application is synchronizing, send, to the web browser application, an indication that local access to the second content item is unavailable.

15. The computing system of claim 10, wherein the local web server stores website data corresponding to an online website of the content management system, and wherein the local web server comprises instructions that, when executed by the one or more processors, cause the local web server to:

provide an interface comprising elements from the online website of the online content management system, the interface being specified by the website data.

16. A method comprising:

receiving, by local web server running on a computing system, from a web browser application—on the computing system, a request to access content associated with a user account registered at a content management system, the content being stored at the content management system;

in response to the request, determining, by the local web server, whether to serve a local copy of the content to the web browser application or direct the web browser application to access the content from the content management system based on at least one of a type of access requested, a network connectivity state associated with the computing system, or synchronization activity between a client-side application on the computing system and the content management system, the local copy being stored at the computing system by the client-side application and synchronized via bidirectional synchronization between the client-side application and the content management system;

in response to determining to serve the local copy of the content to the web browser application:

obtaining, by the local web server, the local copy of the content; and providing, by the local web server, the local copy of the content.

17. The method of claim 15 wherein the local copy of the content is provided to a native application on the computing system selected from a plurality of native applications on the computing system based on a file type of the local copy of the content.

18. The method of claim 17, further comprising:

determining the file type of the local copy of the content; and sending, to the native application, a second request to present the local copy of the content on the computing system.

19. The method of claim 16, further comprising:

receiving a second request to access a content item from the content associated with the user account;

determining whether the client-side application is synchronizing content with the content management system; and when the client-side application is synchronizing content with the content management system, notifying the web browser application that local access to the content item is unavailable.

20. The method of claim 16, further comprising:

receiving a second request to access a content item from the content associated with the user account;

determining whether the second request to access the content item comprises a read request or a write request; and when the second request to access the content item comprises the read request, providing a respective local copy of the content item to the web browser application; and when the second request to access the content item comprises the write request, redirecting the second request to the content management system.

\* \* \* \* \*